(12) United States Patent
Walter et al.

(10) Patent No.: US 8,104,221 B2
(45) Date of Patent: Jan. 31, 2012

(54) ANIMAL TRAP HAVING TIMED RELEASE DOOR

(75) Inventors: Glen V. Walter, Boxford, MA (US); David G. Harting, Needham, MA (US)

(73) Assignee: Eleven LLC, Boston, MA (US)

( * ) Notice: Subject to any disclaimer, the term of this patent is extended or adjusted under 35 U.S.C. 154(b) by 0 days.

(21) Appl. No.: 13/111,243

(22) Filed: May 19, 2011

(65) Prior Publication Data

US 2011/0214337 A1 Sep. 8, 2011

Related U.S. Application Data

(62) Division of application No. 12/480,885, filed on Jun. 9, 2009, now Pat. No. 7,958,668.

(60) Provisional application No. 61/061,300, filed on Jun. 13, 2008.

(51) Int. Cl.
*A01M 23/00* (2006.01)
*A01M 23/16* (2006.01)
*A01M 23/18* (2006.01)
*A01M 23/20* (2006.01)

(52) U.S. Cl. ..................... 43/61; 43/58; 43/60

(58) Field of Classification Search ............. 43/58, 60, 43/61, 43.12, 100, 105; 70/267–274
See application file for complete search history.

(56) References Cited

U.S. PATENT DOCUMENTS

| | | | | |
|---|---|---|---|---|
| 580,736 A * | 4/1897 | Smith | ............. | 70/273 |
| 601,341 A * | 3/1898 | Hazeley | ............. | 70/273 |
| 872,556 A * | 12/1907 | Carwile | ............. | 43/100 |
| 1,728,645 A * | 9/1929 | Ward et al. | ............. | 43/100 |
| 1,913,823 A * | 6/1933 | Witte | ............. | 43/61 |
| 2,016,534 A * | 10/1935 | Blackwell et al. | ............. | 70/273 |
| 2,119,828 A * | 6/1938 | Nordenstam | ............. | 43/100 |
| 2,157,682 A * | 5/1939 | Sweeny | ............. | 70/272 |
| 2,163,961 A * | 6/1939 | Pendry | ............. | 43/61 |
| 2,415,911 A * | 2/1947 | Rubane | ............. | 70/273 |
| 2,456,963 A * | 12/1948 | Leatherman | ............. | 70/273 |
| 2,530,449 A * | 11/1950 | Bush | ............. | 43/102 |
| 2,613,527 A * | 10/1952 | Harris | ............. | 70/273 |
| 2,681,560 A * | 6/1954 | Craven Shuttleworth et al. | ............. | 70/273 |
| 2,760,297 A * | 8/1956 | Buyken | ............. | 43/105 |
| 2,769,274 A * | 11/1956 | Ougland | ............. | 43/65 |
| 3,115,027 A * | 12/1963 | Anderson | ............. | 70/272 |
| 3,119,248 A * | 1/1964 | Kaminsky | ............. | 70/272 |
| 3,206,957 A * | 9/1965 | Reitzes | ............. | 70/272 |
| 3,363,439 A * | 1/1968 | Kende | ............. | 70/272 |
| 3,722,742 A * | 3/1973 | Wertz | ............. | 221/15 |
| 3,750,435 A * | 8/1973 | Belkin | ............. | 70/272 |
| 3,798,937 A * | 3/1974 | Sysk | ............. | 70/269 |
| 3,842,529 A * | 10/1974 | Richard | ............. | 43/100 |
| 3,999,412 A * | 12/1976 | Boroski et al. | ............. | 70/269 |
| 4,076,118 A * | 2/1978 | Karlsson | ............. | 70/272 |
| 4,084,415 A * | 4/1978 | Corman | ............. | 70/272 |
| 4,184,283 A * | 1/1980 | Wyman | ............. | 43/65 |
| 4,418,493 A * | 12/1983 | Jordan | ............. | 43/61 |
| 4,765,089 A * | 8/1988 | Rowe | ............. | 43/105 |
| D298,574 S * | 11/1988 | Long et al. | ............. | D27/187 |

(Continued)

*Primary Examiner* — Darren W Ark

(74) *Attorney, Agent, or Firm* — Lando & Anastasi, LLP

(57) ABSTRACT

An animal trap includes a housing having an opening, a door coupled to the housing, and a latch mechanism. The door is movable between a closed position in which the door obstructs the opening and an open position in which the opening is unobstructed. The latch mechanism is coupled to either the housing or the door and is configured to enable the door to be opened after a period of time has elapsed.

4 Claims, 11 Drawing Sheets

U.S. PATENT DOCUMENTS

| | | | |
|---|---|---|---|
| 4,862,431 A * | 8/1989 | Drouin | 368/10 |
| 4,890,415 A * | 1/1990 | Fressola et al. | 43/61 |
| 4,912,872 A * | 4/1990 | Wynn et al. | 43/61 |
| 5,129,536 A * | 7/1992 | Robinson | 70/271 |
| 5,259,809 A * | 11/1993 | Rainey, Jr. | 43/100 |
| 5,862,624 A * | 1/1999 | Askins | 43/61 |
| 5,894,694 A * | 4/1999 | Erlandson | 43/100 |
| 5,926,997 A * | 7/1999 | Wilcox | 43/58 |
| 5,943,812 A * | 8/1999 | Pizzolato | 43/58 |
| 5,974,725 A * | 11/1999 | Knight | 43/100 |
| 6,035,575 A * | 3/2000 | Hilty | 43/100 |
| 6,098,334 A * | 8/2000 | Stouffer | 43/61 |
| 6,453,602 B1 * | 9/2002 | Russell et al. | 43/100 |
| 6,694,669 B2 * | 2/2004 | Gehret et al. | 43/61 |
| 7,464,570 B1 * | 12/2008 | Chen | 70/267 |
| 7,540,109 B2 * | 6/2009 | Hall | 43/61 |
| 7,681,422 B2 * | 3/2010 | Tonaltzin | 70/267 |
| 7,958,668 B2 * | 6/2011 | Walter et al. | 43/61 |
| 2002/0157437 A1 * | 10/2002 | Laurie | 70/272 |
| 2003/0230124 A1 * | 12/2003 | Johnson et al. | 70/267 |
| 2005/0229477 A1 * | 10/2005 | Gomez | 43/100 |
| 2009/0211316 A1 * | 8/2009 | Butler et al. | 70/273 |
| 2009/0249681 A1 * | 10/2009 | Havens et al. | 43/58 |

* cited by examiner

ANIMAL TRAP HAVING TIMED RELEASE DOOR

CROSS-REFERENCE TO RELATED APPLICATIONS

This application is a divisional of U.S. patent application Ser. No. 12/480,885, entitled "ANIMAL TRAP HAVING TIME-RELEASE DOOR," filed on Jun. 9, 2009, which claims priority under 35 U.S.C. §119(e) to U.S. Provisional Application No. 61/061,300, entitled "ANIMAL TRAP HAVING TIME-RELEASE DOOR," filed on Jun. 13, 2008 (now Expired), which both are hereby incorporated by reference in its entirety for all purposes.

BACKGROUND OF THE INVENTION

1. Field of the Disclosure

The present disclosure relates to animal traps, and more particularly to an animal trap configured to enable release of a trapped animal after a predetermined period of time.

2. Discussion of Related Art

Many traps exist which capture nuisance animals without harming them for later relocation and release. Reference may be made to U.S. Pat. Nos. 4,912,872 and 5,862,624 for examples of conventional animal traps adapted to trap a live animal without inflicting injury upon the animal. Such animal traps include a housing having a top wall, a bottom wall, two side walls, and either a door opening and a door at both ends, or a door opening and a door at one end and an end wall at the opposing end. To set these animals free from such traps, it is necessary to stand adjacent to the trap and open the door by hand. This action exposes the user to potential attack by the released animal.

BRIEF SUMMARY OF THE INVENTION

In a first implementation of this disclosure, an animal trap includes a housing having an opening, a door coupled to the housing, and a latch mechanism. The door is movable between a closed position in which the door obstructs the opening and an open position in which the opening is unobstructed. The latch mechanism is coupled to either the housing or the door and is configured to enable the door to be opened after a period of time has elapsed.

One or more of the following features may be included. The latch mechanism may include at least one latching flange coupled to either the housing or the door, and at least one latching receiver coupled to the other of the housing or the door. The arrangement is such that the receiver may be detachably coupled to the flange. The latch mechanism may include a time delay release mechanism that embodies a mechanical and/or electronic timer to control the release of the latch from the receiver to open the door after a period of time.

At least one secondary latching flange may be coupled to either the housing or the door, and at least one secondary latching receiver may be coupled to the other of the housing or the door. The arrangement is such that the secondary receiver may be detachably coupled to the secondary flange.

A spring mechanism may be connected to the door and to the housing. The spring mechanism is configured to bias the door to the open position.

The latch mechanism may include a tab associated with the door and a knob having a slot. The arrangement is such that the knob engages the tab to secure the door in the closed position. Upon alignment of the tab with the slot, the door is enabled to move between the closed position and the open position.

A door frame may be attached to the housing surrounding the opening. The arrangement may include at least one latching flange coupled to either the door or the door frame, and at least one latching receiver coupled to the other of the door or the door frame. The latching receiver may be configured to be detachably coupled to the latching flange.

In another implementation of this disclosure, a method of releasing an animal from an animal trap of the type including a housing having an opening and a door includes securing the door in a closed position using a releasable latch and activating a time delay release mechanism. The arrangement is such that after a period of time the releasable latch is released, enabling the door to be moved to an open position. The method may include moving the door to the open position.

Another aspect of the disclosure is directed to an animal trap comprising a housing having an opening, a door coupled to the housing, the door being movable between a closed position in which the door obstructs the opening and an open position in which the opening is unobstructed, and a latch mechanism coupled to one of the housing and the door. The latch mechanism is configured to secure the door in the closed position and to enable the movement of the door to the open position after a period of time.

In one embodiment, the latch mechanism includes a tab associated with one of the housing and the door, and a knob associated with the other of the housing and the door. The knob has a slot formed therein. The arrangement is such that the knob engages the tab to secure the door in the closed position, and, upon alignment of the tab with the slot so that the tab may travel through the slot, the door is enabled to move to the open position. The latch mechanism further includes a timer coupled to the knob. The timer controls a rotation of the knob. Te time delay release mechanism includes one of a mechanical timer and an electronic timer. A secondary latching mechanism is coupled to one of the housing and the door.

Another aspect of the disclosure is directed to a method of releasing an animal from an animal trap of the type including a housing having an opening and a door. The method comprises: securing the door in a closed position in which the opening is obstructed, the door being secured by a releasable latch; and activating a time delay release mechanism configured to release the releasable latch to open the door upon an expiration of a predetermined period of time.

In one embodiment, the method includes moving the door to the open position after the predetermined period of time. In another embodiment, activating the time delay release mechanism includes turning a knob to activate a timer of the time delay release mechanism, and/or aligning a slot of the knob with a tab of the housing.

A better understanding of the disclosure will become apparent from the following detailed description and accompanying drawings which set forth illustrative examples and are indicative of the various ways in which the subject disclosure may be employed.

BRIEF DESCRIPTION OF THE DRAWINGS

Exemplary devices and methods for animal traps having a timed release door are described hereinafter with reference to the following drawings in which.

Like reference symbols in the various drawings indicate like elements.

DETAILED DESCRIPTION OF THE PREFERRED EMBODIMENTS

Referring to the figures, the following describes exemplary embodiments of animal traps having timed release doors.

Figure 1:
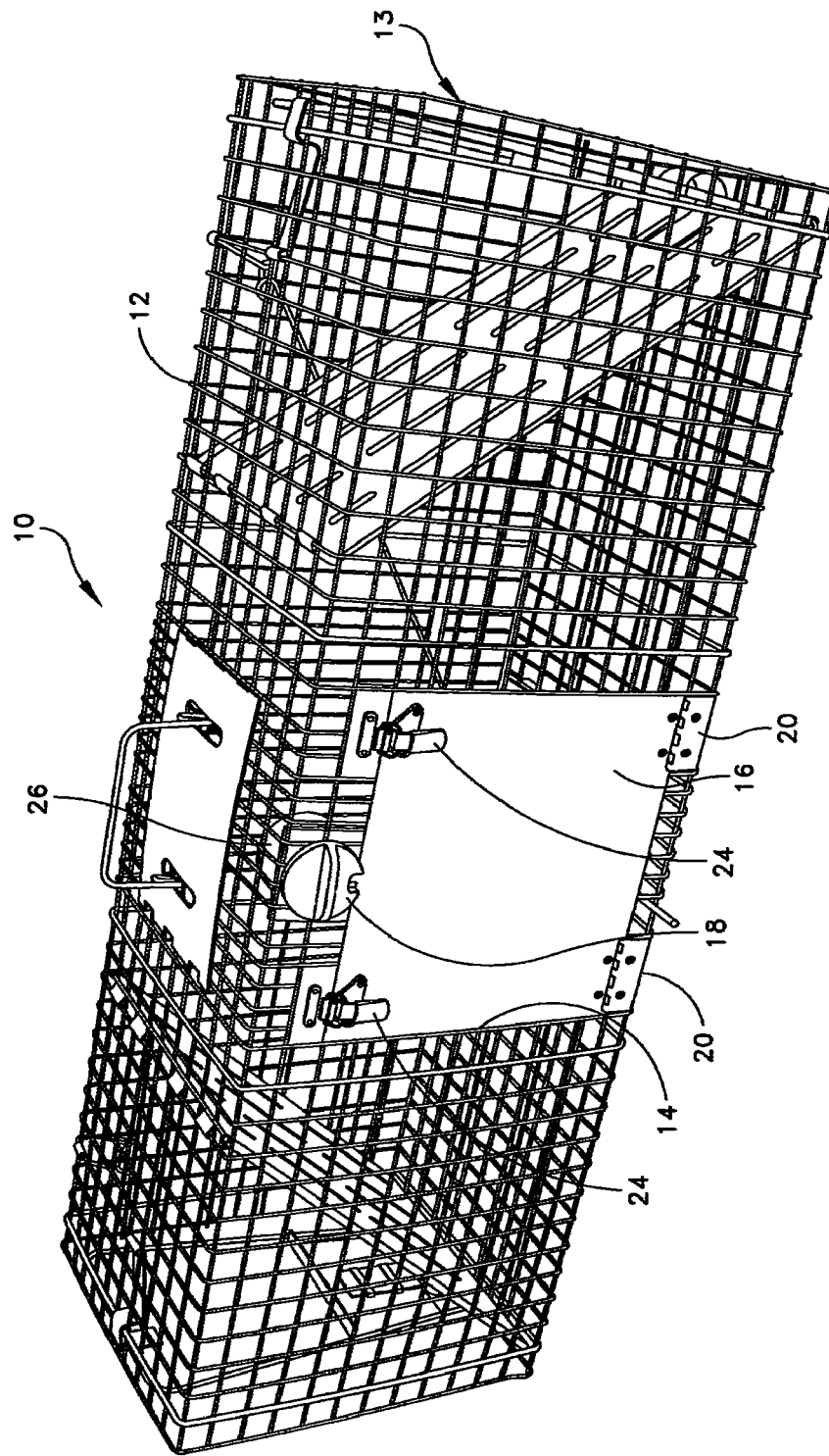
FIGS. 1 and 2 are front perspective views of an exemplary embodiment of an animal trap illustrating the door in the closed and open positions, respectively.
Figure 2:
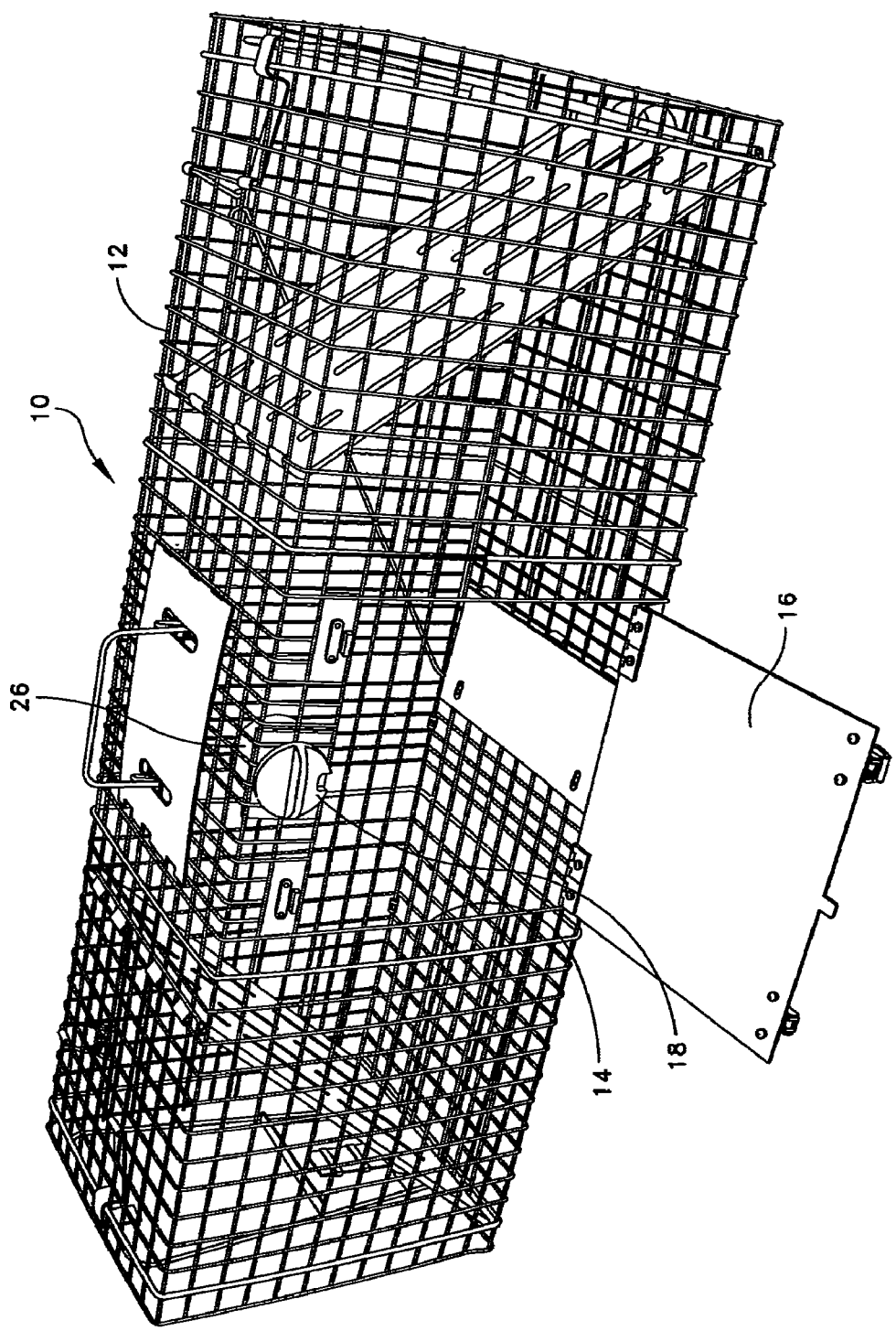

Referring to FIGS. 1 and 2, there is generally indicated at 10 an animal trap. In the shown embodiment, the animal trap 10 includes a housing 12 having a top, a bottom, a front, a back, two ends, an opening 14, a door 16, and a latch mechanism 18. As shown, the housing 12, in one embodiment, is fabricated from stainless steel wire, for example. At each end of the housing 12, conventional capture mechanisms 13 are provided to capture a live animal once the animal enters the housing through either of the opposed door openings by utilizing a door at each door opening which is movable between an open position allowing an animal to enter the trap and a closed position in which the door prevents a captured animal from exiting the trap (as illustrated in FIG. 1), wherein the door is biased to the closed position; however, a housing having a capture mechanism at one end and an enclosure at the other end may be employed with equal effectiveness. The opening 14, the door 16, and the latch mechanism 18 are independent of the capture mechanisms of the animal trap 10, and collectively function as a user-controlled escape hatch to release the trapped animal from the animal trap. The latch mechanism 18 includes a time delay release mechanism, e.g., a mechanical and/or electronic timer 26, which is user activated to set the time in which the door 16 opens.

The door 16 is connected to the housing 12 by one or more hinges 20 that enable the door to move between a closed position, which is shown in FIG. 1, and an open position, which is shown in FIG. 2. In the closed position, the door 16 obstructs the opening 14. In the open position, the opening 14 is unobstructed so that a trapped animal may escape from the animal trap 10. The latch mechanism 18 is coupled to either the housing 12 or the door 16 and is configured to enable the door to be opened after a period of time has elapsed. The period of time is ideally sufficient to allow a user to move to a safe location prior to releasing the trapped animal, thereby reducing the risk of potential attack by the animal. The door 16 may be configured such that gravity or a trapped animal causes the door to fall open. Alternatively, a spring mechanism, e.g., a coil or leaf spring, may be connected to the door 16 and to the housing 12 to facilitate moving the door to the open position. When configured with a spring mechanism, the door 16 will automatically move to the open position when the timer 26 releases the latch mechanism 18. The spring mechanism is designed to positively move the door 16 to the open position instead of relying on gravity to perform this function.

Still referring to FIGS. 1 and 2, to prevent the door 16 from opening prematurely and prior to user activation of the timer 26 of the latch mechanism 18, at least one secondary latching device 24 may be provided to secure the door to the housing 12. Each latching device may include a flange that is coupled to either the housing or the door, and a receiver that is coupled to the other of the housing or the door. The arrangement is such that the receiver may be detachably fastened to the flange. Prior to activating the timer 26, the secondary latching devices 24 may be fastened to secure the door 16 in the closed position. After the timer 26 is activated, the secondary latching devices 24 may be unfastened to enable the door 16 to move to the open position. In this example, the secondary latching devices 24 may be manually operated; however, alternative latching mechanisms, such as an automated latching mechanism, may be employed with equivalent effectiveness.

Figure 3:
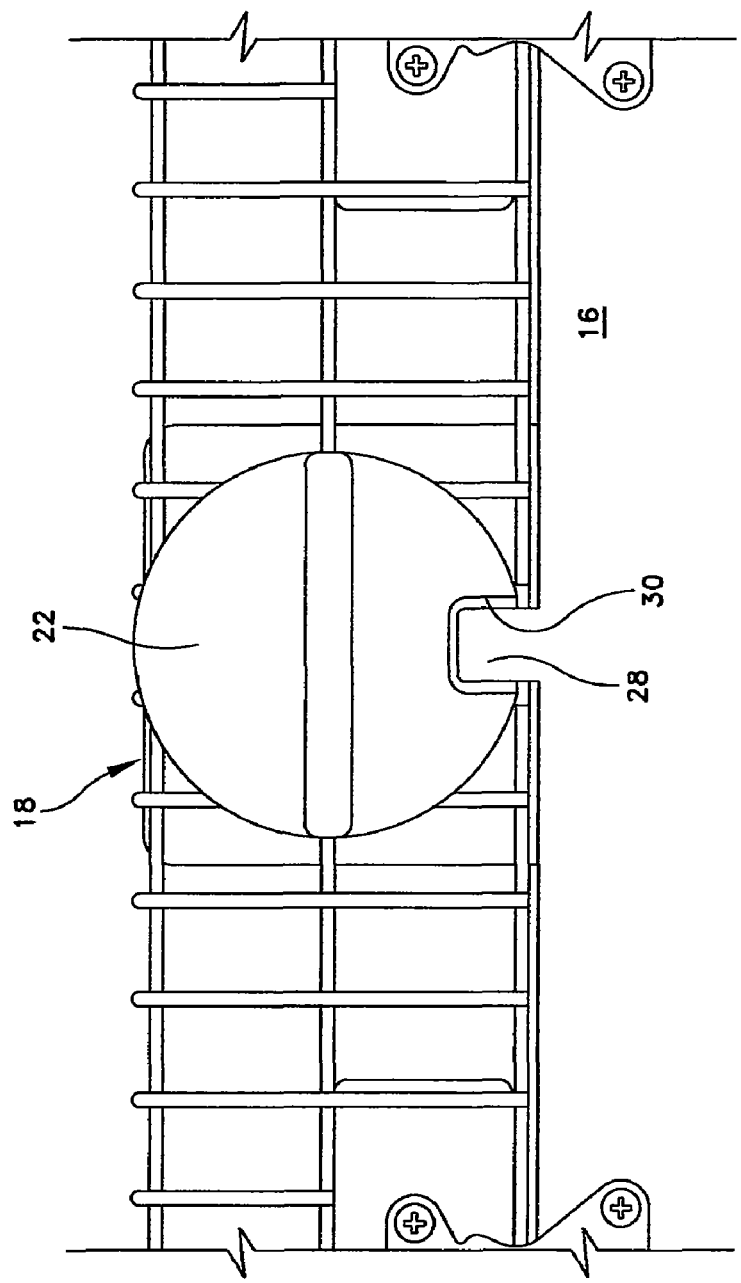
FIG. 3 is an enlarged front elevation view of the animal trap shown in FIGS. 1 and 2 illustrating the details of a latch mechanism.

Referring now to FIG. 3, the latch mechanism may include a knob 22 that is configured to rotate. The knob 22 may have a slot 30 formed therein. The door 16 may have a top edge with a latching tab 28 disposed thereon. The slot 30 and the latching tab 28 may be designed to operate together to allow free motion of the door 16 between the closed position and the open position when the slot is aligned with the latching tab. The arrangement is such that upon activating the latch mechanism 18 by turning the knob 22, the knob may engage the latching tab 28 so as to prevent the door 16 from moving to the open position. The knob 22 may be connected to the timer 26, e.g., a mechanical timing device, that rotates the knob while the timer is activated. When the timer 26 is activated, after a period of time the slot 30 in the knob 22 is aligned with the latching tab 28. Once aligned, the door 16 may open to release the animal that is trapped in the housing 12, provided the secondary latching devices 24, illustrated in FIGS. 1 and 2, are unfastened.

Figure 4:
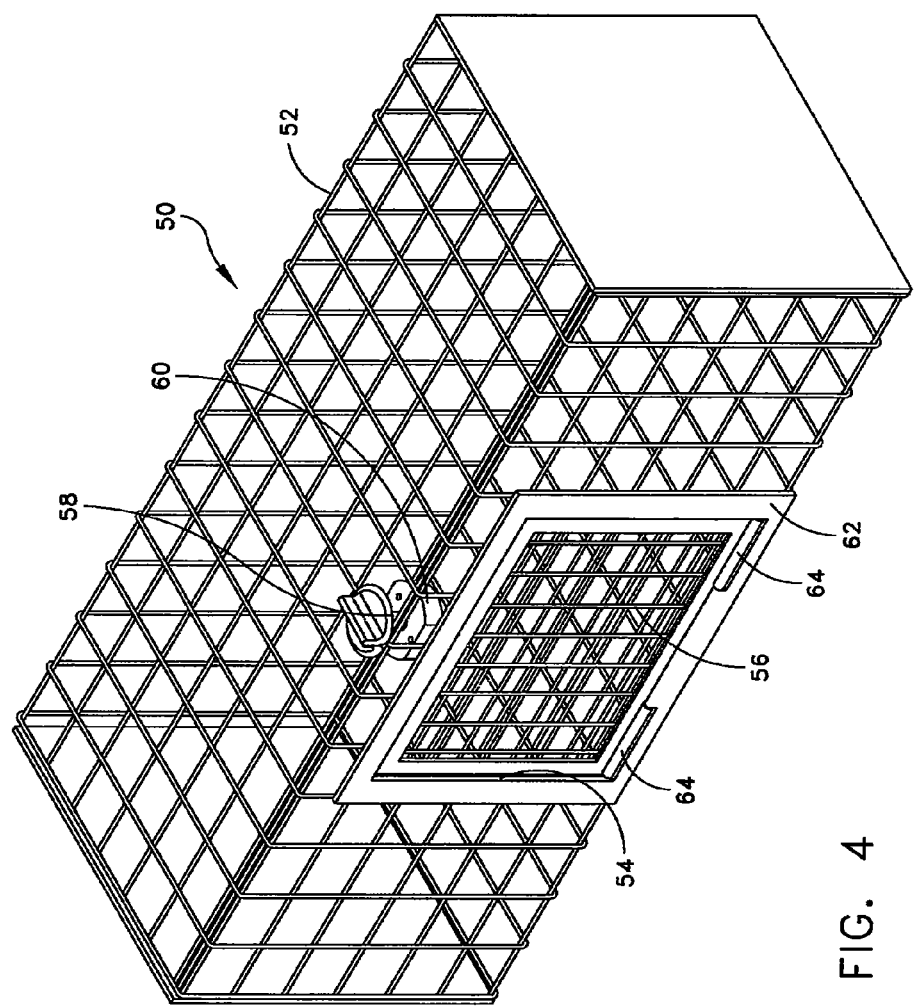
FIGS. 4 and 5 are front perspective views of an alternative exemplary embodiment of an animal trap illustrating the door in the closed and open positions, respectively.
Figure 5:
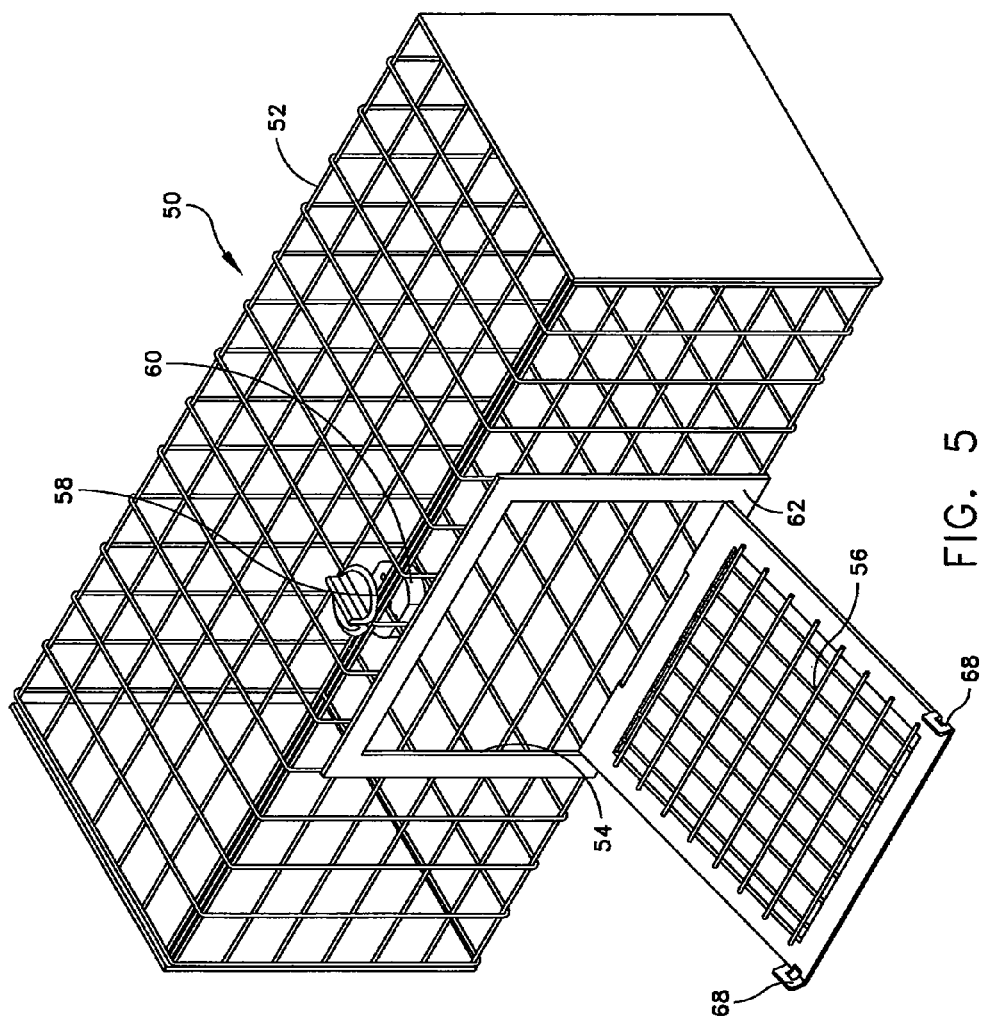

Referring to FIGS. 4 and 5, in another example there is generally indicated at 50 an animal trap similar in construction to the animal trap 10 described above. The animal trap 50 includes a housing 52 having a top, a bottom, a front, a back, two ends, an opening 54, a door 56, and a latch mechanism 58. The latch mechanism 58 includes a mechanical and/or electronic timer 60 which may be user activated. A door frame 62 may be secured to the housing 52 surrounding the opening to reinforce the security of the door 56 within the opening 54 and to improve the construction of the animal trap 50.

The door 56 may be connected to the housing 52 by one or more hinges 64 that enable the door to move between a closed position, as shown in FIG. 4, in which the door obstructs the opening 54, and an open position, as shown in FIG. 5, in which the opening is unobstructed. Upon moving the door 56 to the open position, a trapped animal may escape from the animal trap 50. The latch mechanism 58 is coupled to either the housing 52 or the door 56 and is configured to enable the door to be opened after a period of time has elapsed. The period of time is ideally sufficient to allow a user to move to a safe location prior to releasing the trapped animal, thereby reducing the risk of potential attack by the animal. The latch mechanism 58 may be located, for example, on the top of the housing 52, as illustrated in FIGS. 4 and 5, or on the front of the housing, not shown. The door 56 may be configured such that gravity or a trapped animal causes the door to fall open. Alternatively, a spring mechanism, e.g., a coil or leaf spring, may be connected to the door 56 and to the housing 52 to facilitate moving the door to the open position. When configured with a spring mechanism, the door 56 will automatically move to the open position when the timer 60 releases the latch mechanism 58. The spring mechanism is designed to positively move the door 56 to the open position instead of relying on gravity to perform this function.

Figure 6:
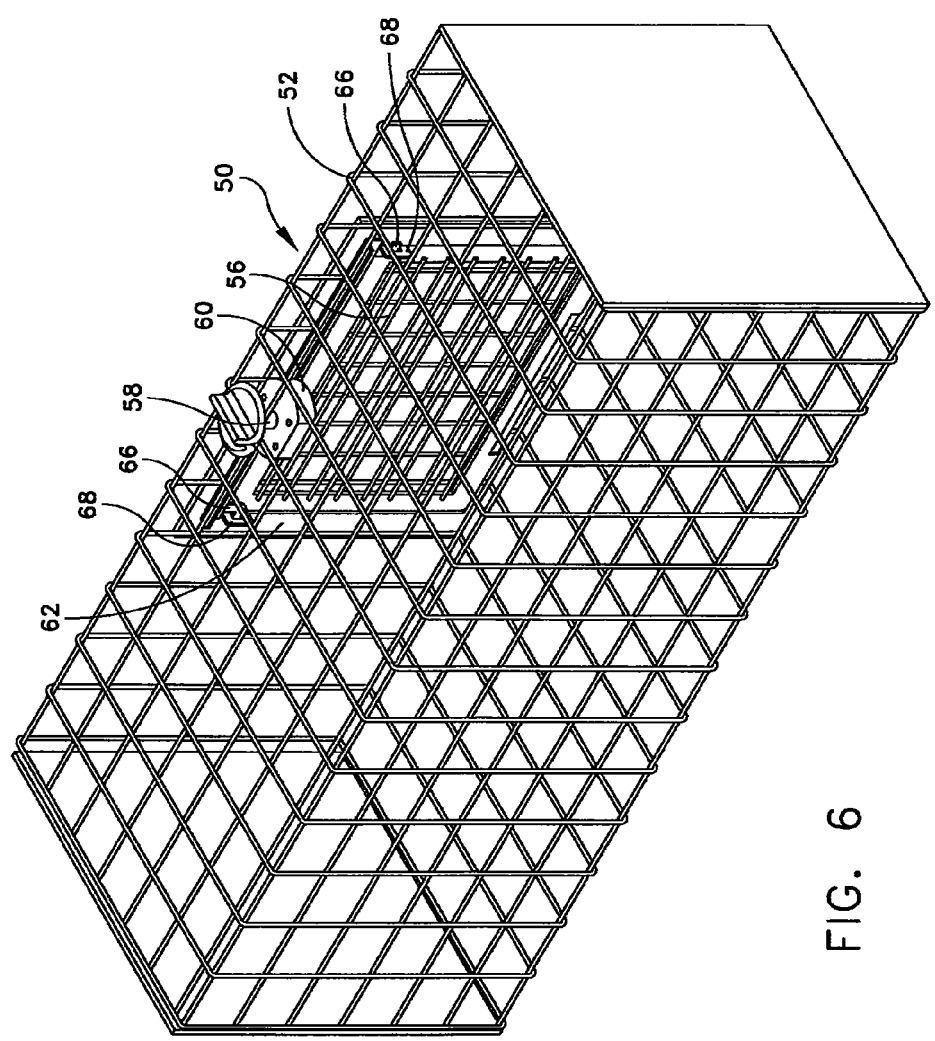
FIG. 6 is a rear perspective view of the animal trap shown in FIGS. 4 and 5.

Referring now to FIGS. 5 and 6, the latch mechanism 58 may include one or more latches 66 formed on the door 56, and one or more latch receivers 68 attached to the housing 52. The latches and latch receivers may be configured such that when the door 56 is moved to the closed position, the latches may be extended through the latch receivers to secure the door in the closed position. The timer 60 may be connected to the latch mechanism 58 so as to control the operation of the latch mechanism. The arrangement is such that upon expiration of the timer 60, the timer forces the latches 66 to retract from the latch receivers 68, enabling the door 56 to move to the open position. In this configuration the secondary latching mechanism may be eliminated. Alternatively, and not illustrated, one or more latches may be attached to the housing 52, and one or more latch receivers may be attached to the door 56. Other permutations of the arrangement of the latches, latch receivers, and the timer 60 may be employed with equivalent effectiveness.

Referring to FIGS. 4-6, the door frame 62 may be attached to the housing 52 surrounding the opening 54 to reinforce the security of the door within the opening and to improve the construction of the animal trap 50. Further, in this configuration either the latches or the latch receivers may be attached to the door frame.

Figure 7:
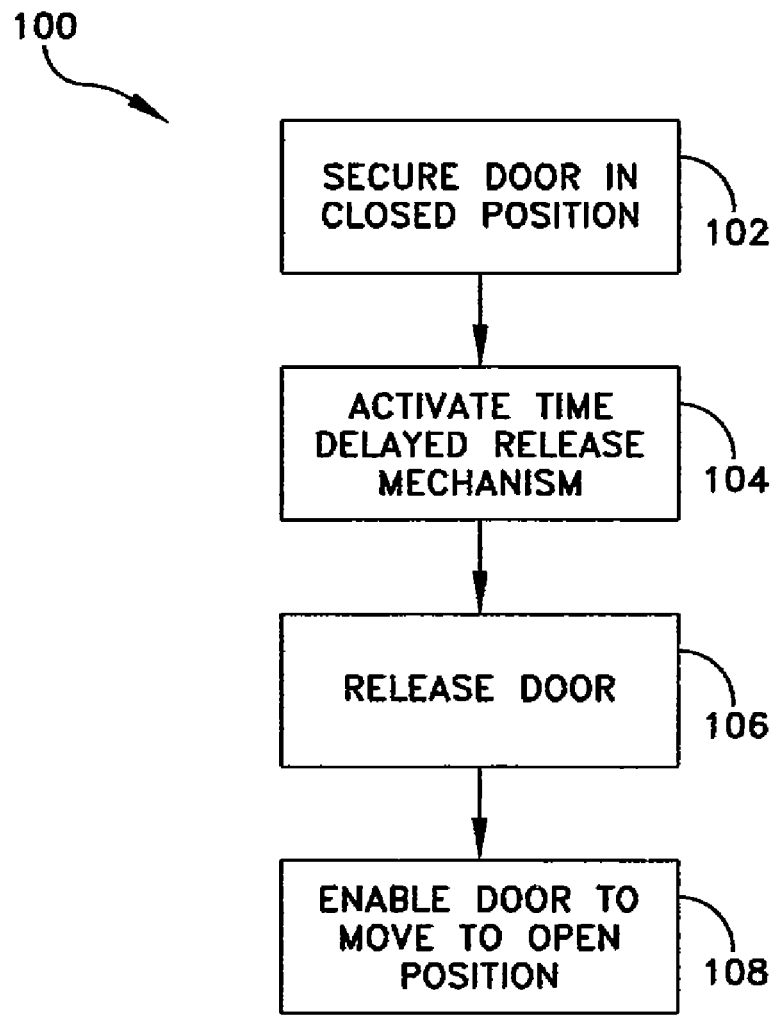
FIG. 7 is a flow diagram of an exemplary embodiment of a method of releasing an animal from an animal trap.

Referring now to FIG. 7, an exemplary method of releasing an animal from an animal trap is generally indicated at 100. The animal trap may be of the types described above, the animal trap including a housing having an opening and a door. The method 100 may include securing the door in a closed position at 102 by using a releasable latch, activating a time delay release mechanism at 104, and releasing the door at 106. The time delay release mechanism may be configured to actuate the releasable hatch after a period of time has elapsed, with the period of time being sufficient to allow the user to move to a safe position. Upon releasing the door at 106, the door may be enabled to move to an open position at 108, thus allowing the trapped animal to escape from the trap.

Figure 8:
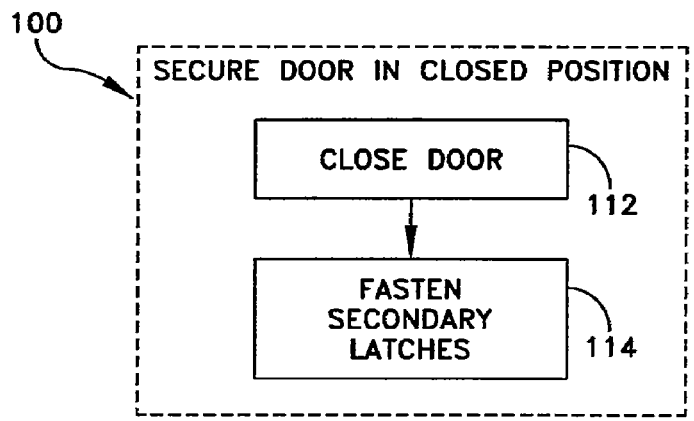
FIGS. 8-10 are flow diagrams illustrating the details of the method shown in FIG. 7.
Figure 9:
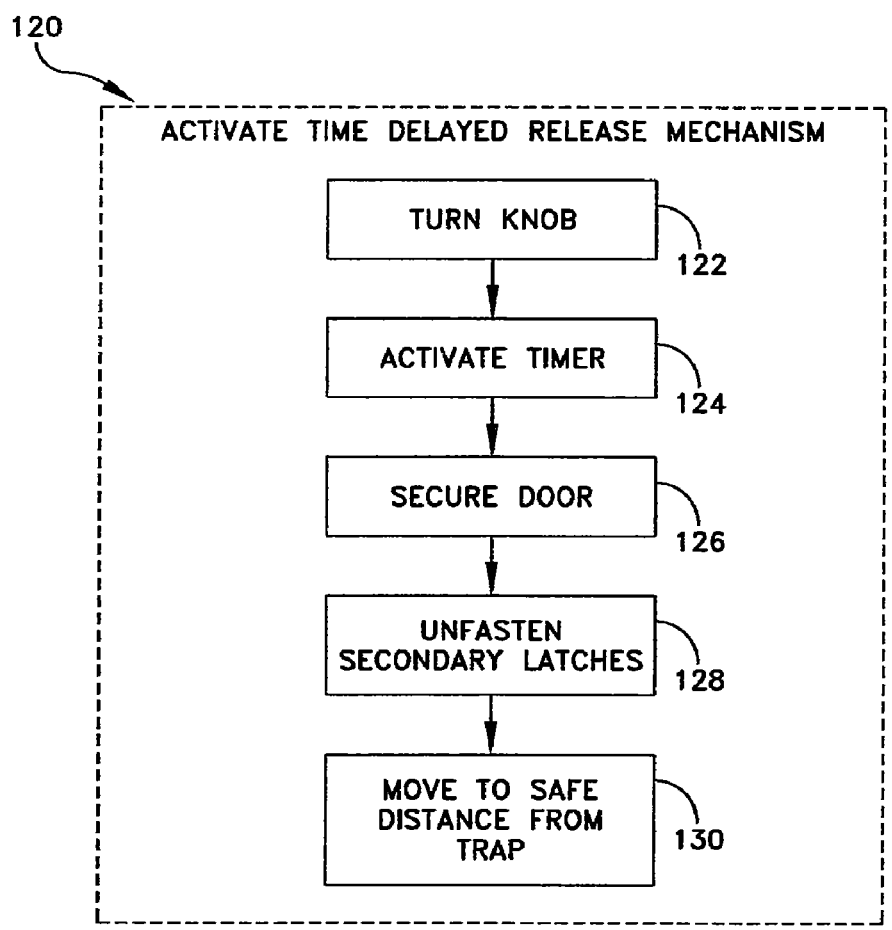
Figure 10:
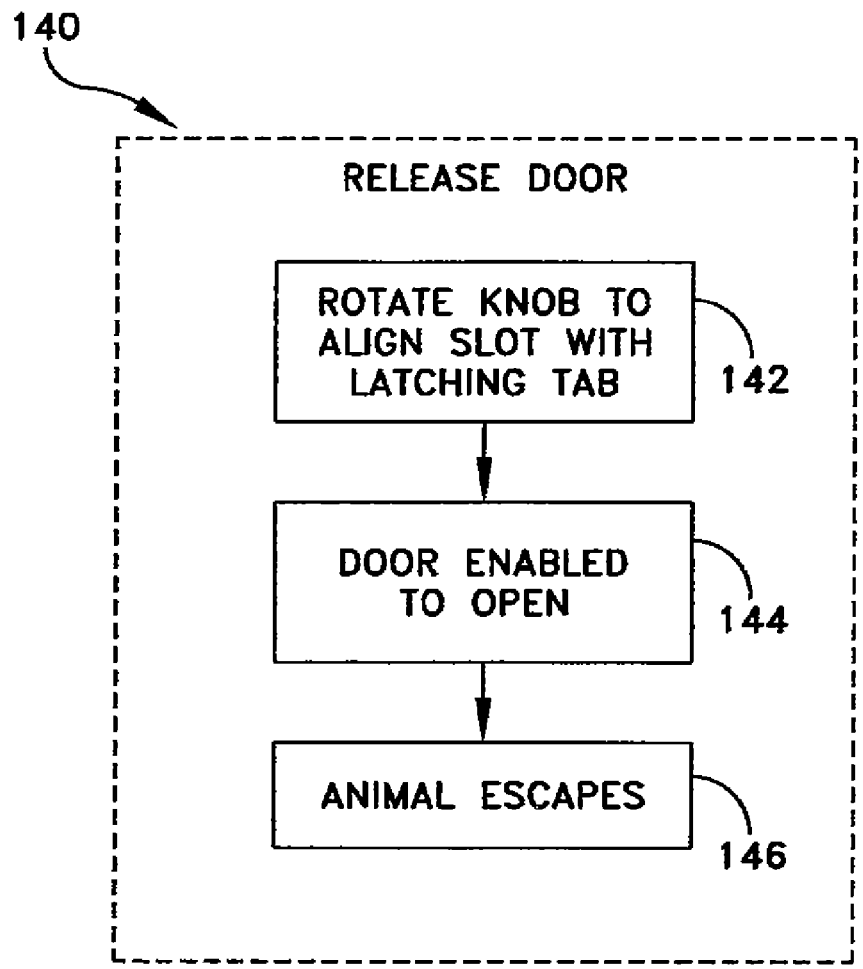

The following describes in further detail the method of releasing an animal from an animal trap using the animal trap illustrated in FIGS. 1, 2, and 3. Referring first to FIG. 8, a user may secure the door in the closed position, generally indicated at 110, by closing the door at 112 and fastening the secondary latches at 114. Referring next to FIG. 9, after an animal is inside the trap the user may activate the time delay release mechanism, generally indicated at 120, by turning the knob at 122, which may activate the timer at 124 and secure the door at 126 by engaging the latching tab. After the knob has been turned at 122, the user may unfasten the secondary latches at 128 and move a safe distance away from the trap at 130. Referring next to FIG. 10, the door may be released, generally indicated at 140, when the timer rotates the knob to a position where the slot is aligned with the latching tab at 142. After the slot and the latching tab are aligned at 142, the door may be enabled to open at 144, allowing the trapped animal to escape from the trap at 146.

Figure 11:
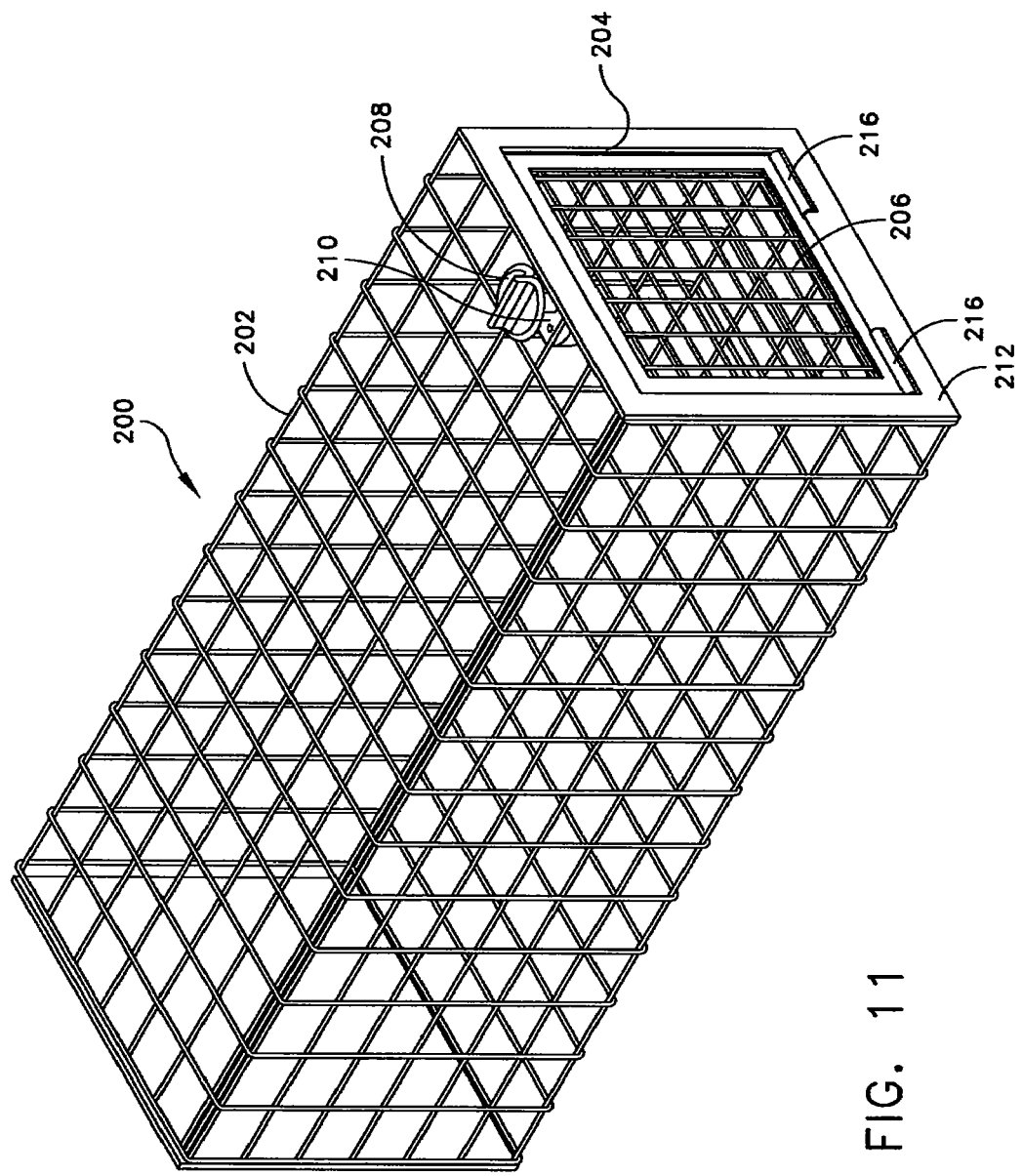
FIGS. 11 and 12 are front perspective views of another exemplary embodiment of an animal trap illustrating the door in the closed and open positions, respectively.
Figure 12:
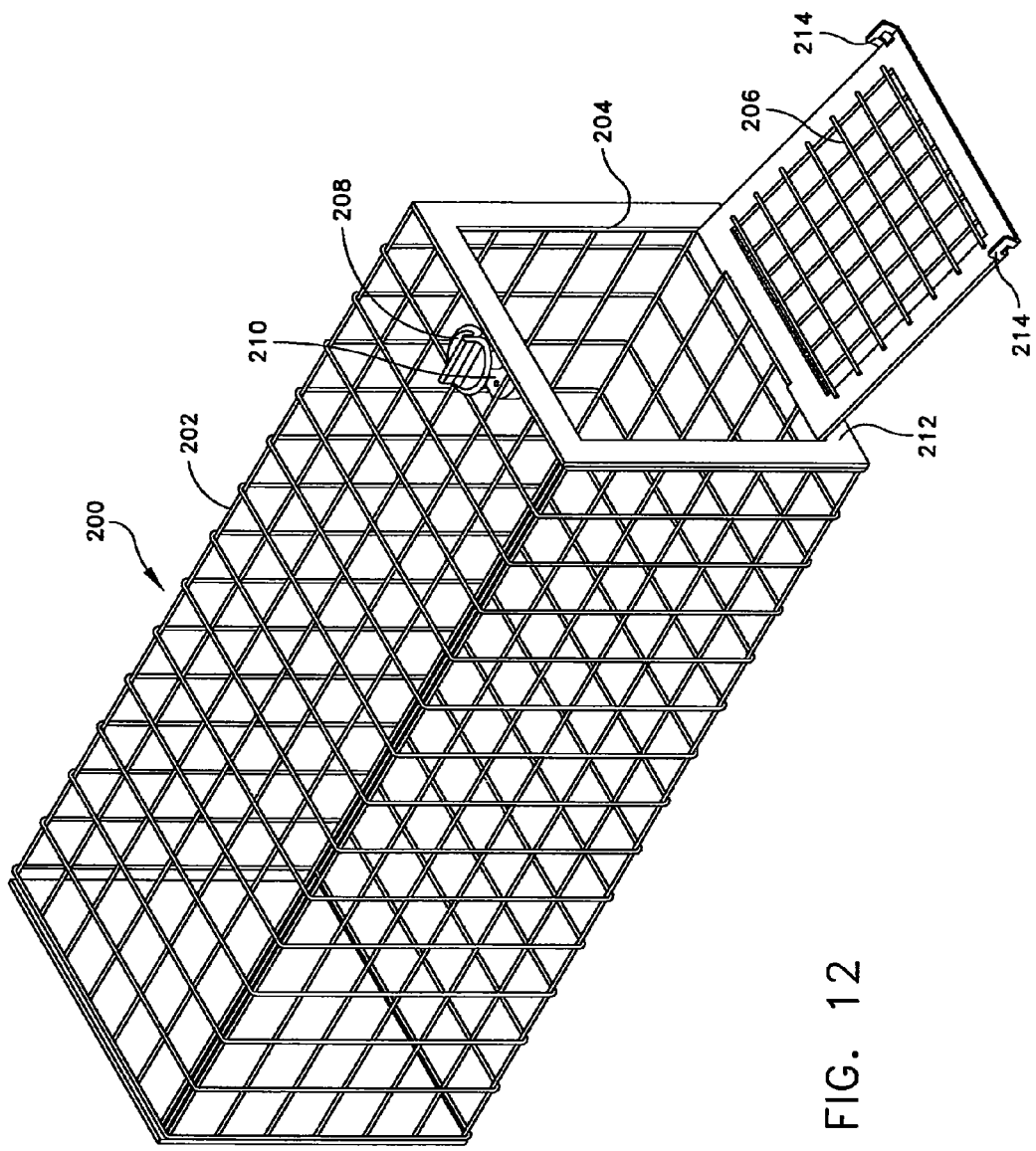

Referring to FIGS. 11 and 12, in another example there is generally indicated at 200 an animal trap similar in construction to the animal trap 50 described above. The animal trap 200 includes a housing 202 having a top, a bottom, a front, a back, two ends, an opening 204 formed on one end of the housing, a door 206, and a latch mechanism 208. The latch mechanism 208 includes a mechanical and/or electronic timer 210 which may be user activated. A door frame 212 may be secured to the housing 202 surrounding the opening 204 to reinforce the security of the door 206 within the opening 204 and to improve the construction of the animal trap 200.

The door 206 may be connected to the housing 202 by one or more hinges 216 that enable the door to move between a closed position, as shown in FIG. 11, in which the door obstructs the opening 54, and an open position, as shown in FIG. 12, in which the opening is unobstructed. Upon moving the door 206 to the open position, a trapped animal may escape from the animal trap 200. The latch mechanism 208 is coupled to either the housing 202 or the door 206 and is configured to enable the door to be opened after a period of time has elapsed. The period of time is ideally sufficient to allow a user to move to a safe location prior to releasing the trapped animal, thereby reducing the risk of potential attack by the animal. The latch mechanism 208 may be located, for example, on the top of the housing 202, as illustrated in FIGS. 11 and 12, or on the end of the housing, not shown. The door 206 may be configured such that gravity or a trapped animal causes the door to fall open. Alternatively, a spring mechanism, e.g., a coil or leaf spring, may be connected to the door 206 and to the housing 202 to facilitate moving the door to the open position. When configured with a spring mechanism, the door 206 will automatically move to the open position when the timer 210 releases the latch mechanism 208. The spring mechanism is designed to positively move the door 206 to the open position instead of relying on gravity to perform this function.

As with animal trap 50, the latch mechanism 208 may include one or more latches (not shown) formed on the housing 202 and one or more latch receivers 214 attached to the housing 202. The latches and latch receivers may be configured such that when the door 206 is moved to the closed position, the latches may be extended through the latch to secure the door in the closed position. The timer 210 may be connected to the latch mechanism 208 so as to control the operation of the latch mechanism. The arrangement is such that upon expiration of the timer 210, the timer forces the latches to retract from the latch receivers, enabling the door 206 to move to the open position.

Thus has been described and illustrated several preferred embodiments of the disclosure. However, it will be appreciated by those skilled in the art that alternative embodiments could be developed in light of the disclosure. Accordingly, the exemplary embodiments disclosed should not be construed to limit the scope of the disclosure, which is to be given the full breadth of the following claims and equivalents thereof.

What is claimed is:

1. A method of releasing an animal from an animal trap comprising:

providing an animal trap including a housing having a first opening, a second opening, a door coupled to the housing, and at least one other door coupled to the housing, the door movable between a closed position in which the door obstructs the first opening and an open position in which the first opening is unobstructed by the door, the door being biased to the open position, the at least one other door movable between an open position in which the second opening is unobstructed by the at least one other door to allow an animal to enter the trap and a closed position in which the at least one other door obstructs the second opening and prevents an animal from exiting the trap, the at least one other door being biased to the closed position;

securing the door in the closed position in which the first opening is obstructed, the door being secured by a releasable latch; and activating a time delay release mechanism including a mechanical and/or electronic timer, the time delay release mechanism configured to release the releasable latch to open the door upon an expiration of a predetermined period of time.

2. The method of claim 1, further comprising moving the door to the open position after the predetermined period of time.

3. The method of claim 1, wherein activating the time delay release mechanism includes turning a knob to activate the timer of the time delay release mechanism.

4. The method of claim 1, wherein activating the time delay release mechanism further includes aligning a slot of the knob with a tab of the housing.

* * * * *